(12) United States Patent
Kim et al.

(10) Patent No.: US 12,355,034 B2
(45) Date of Patent: Jul. 8, 2025

(54) ALL SOLID STATE BATTERY WITH IMPROVED DURABILITY AND METHOD FOR MANUFACTURING THE SAME

(71) Applicants: Hyundai Motor Company, Seoul (KR); Kia Corporation, Seoul (KR)

(72) Inventors: Sang Wan Kim, Yuseong-gu (KR); Young Jin Nam, Suwon-si (KR); Sung Man Cho, Gwacheon-si (KR); Jae Min Lim, Suwon-si (KR); Hong Suk Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 167 days.

(21) Appl. No.: 17/457,175

(22) Filed: Dec. 1, 2021

(65) Prior Publication Data

US 2022/0181700 A1   Jun. 9, 2022

(30) Foreign Application Priority Data

Dec. 8, 2020  (KR) .......................... 10-2020-0170220

(51) Int. Cl.
| | | |
|---|---|---|
| *H01M 10/0562* | (2010.01) | |
| *H01M 4/133* | (2010.01) | |
| *H01M 4/134* | (2010.01) | |
| *H01M 4/36* | (2006.01) | |
| *H01M 4/38* | (2006.01) | |
| *H01M 4/587* | (2010.01) | |
| *H01M 4/64* | (2006.01) | |
| *H01M 10/0525* | (2010.01) | |

(Continued)

(52) U.S. Cl.
CPC ....... *H01M 10/0585* (2013.01); *H01M 4/133* (2013.01); *H01M 4/134* (2013.01); *H01M 4/364* (2013.01); *H01M 4/38* (2013.01); *H01M 4/587* (2013.01); *H01M 10/0525* (2013.01); *H01M 50/593* (2021.01)

(58) Field of Classification Search
None
See application file for complete search history.

(56) References Cited

U.S. PATENT DOCUMENTS

2019/0334205 A1* 10/2019 Waseda ................. H01M 4/134
2019/0393505 A1* 12/2019 Suzuki .................... H01M 4/62
2020/0185768 A1*  6/2020 Kang ................ H01M 10/0562

FOREIGN PATENT DOCUMENTS

| KR | 1020180055086 A | 5/2018 | |
|---|---|---|---|
| KR | 20190111996 A | 10/2019 | |
| WO | WO-2018179580 A1 * | 10/2018 | .......... H01M 10/052 |

* cited by examiner

*Primary Examiner* — Yoshitoshi Takeuchi
(74) *Attorney, Agent, or Firm* — Slater Matsil, LLP (57) ABSTRACT

An all solid state battery includes a cathode active material layer disposed in contact with a predetermined area of a cathode current collector, a solid electrolyte layer disposed on the cathode active material layer, and including a central part disposed on the cathode active material layer based on a stack direction of the all solid state battery, and a peripheral part extending from the central part and contacting the cathode current collector while surrounding side surfaces of the cathode active material layer, an anode layer disposed on the solid electrolyte layer and having an area greater than an area of the cathode active material layer but less than an area of the solid electrolyte layer, and a spacer disposed on the solid electrolyte layer and in contact with side surfaces of the anode layer.

19 Claims, 5 Drawing Sheets

(51) Int. Cl.
*H01M 10/0585* (2010.01)
*H01M 50/474* (2021.01)
*H01M 50/486* (2021.01)
*H01M 50/593* (2021.01)

ALL SOLID STATE BATTERY WITH IMPROVED DURABILITY AND METHOD FOR MANUFACTURING THE SAME

CROSS-REFERENCE TO RELATED APPLICATIONS

This application claims the benefit of Korean Patent Application No. 10-2020-0170220, filed on Dec. 8, 2020, which application is hereby incorporated herein by reference.

TECHNICAL FIELD

The present disclosure relates to an all solid state battery having improved durability and a method for manufacturing the same.

BACKGROUND

In general, an all solid state battery is a 3-layer stack including a cathode active material layer bonded to a cathode current collector, an anode active material layer bonded to an anode current collector, and a solid electrolyte disposed between the cathode active material layer and the anode active material layer.

The anode active material layer includes a solid electrolyte in addition to an active material, such as graphite, and the reason for this is to secure lithium ion conductivity in the anode active material layer. However, this causes a reduction in the ratio of the active material in the anode active material layer and increases the volume and the weight of the anode active material layer, thereby reducing the energy density of the all solid state battery.

In order to increase the energy density of the all solid state battery, research on an anodeless all solid state battery in which an anode is omitted and lithium ions generated from a cathode are directly precipitated in an anode current collector during charging is underway.

Figure 1A:
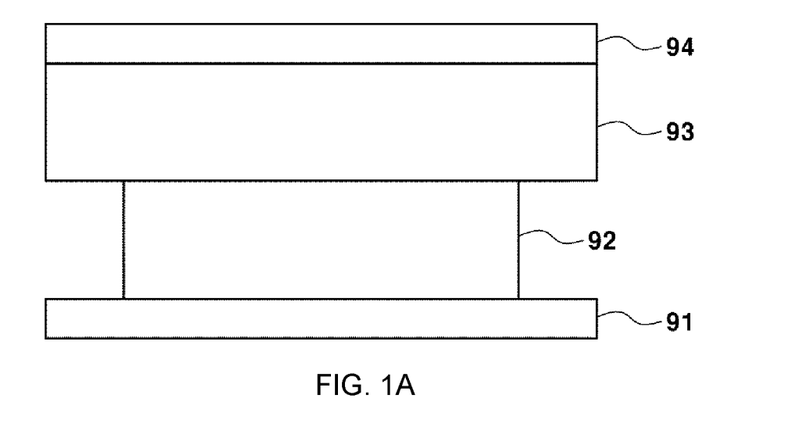
FIG. 1A is a cross-sectional view illustrating a conventional anodeless all solid state battery.

FIG. 1A is a cross-sectional view schematically illustrating an anodeless all solid state battery. The anodeless all solid state battery is an all solid state battery in which a cathode current collector 91, a cathode active material layer 92, a solid electrolyte layer 93, and an anode current collector 94 are sequentially stacked. When the anodeless all solid state battery is charged, lithium ions are precipitated as lithium metal between the solid electrolyte layer 93 and the anode current collector 94, and stored.

Figure 1B:
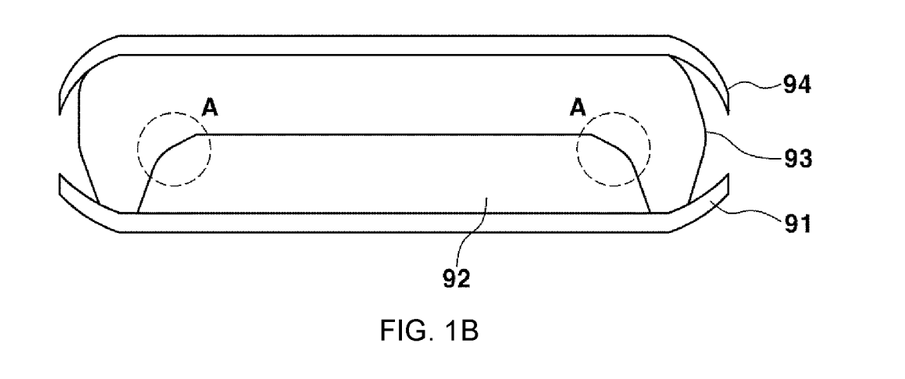
FIG. 1B is a cross-sectional view illustrating a state in which a high pressure is applied to the all solid state battery of FIG. 1A.

Because all elements of an all solid state battery are solid, in order to properly form interfaces between the respective elements, a high pressure must be applied to the all solid state battery. When a high pressure is applied to the anodeless all solid state battery shown in FIG. 1A, the anodeless all solid state battery goes into the configuration shown in FIG. 1B. Edge parts A of the cathode active material layer 92 collapse due to the high pressure and thus the solid electrolyte layer 93 falls in, and the cathode current collector 91 and the anode current collector 94, which are metal thin films, are elongated and bent in a direction of applying pressure. Consequently, the cathode active material layer 92 and the solid electrolyte layer 93 are cracked, and a short is caused due to contact between the cathode current collector 91 and the anode current collector 94.

The above information disclosed in this Background section is only for enhancement of understanding of the background of the invention and therefore it may contain information that does not form the prior art that is already known to a person of ordinary skill in the art.

SUMMARY

Embodiments of the present invention can solve problems associated with the prior art, and an embodiment of the present invention provides an anodeless all solid state battery having a novel structure with high durability and high energy density.

One embodiment of the present invention provides an all solid state battery including a cathode current collector, a cathode active material layer configured such that one surface thereof comes into contact with a designated area of the cathode current collector, a solid electrolyte layer disposed on the cathode active material layer and including a central part disposed on the cathode active material layer based on a stack direction of the all solid state battery, and a peripheral part configured to extend from the central part so as to come into contact with the cathode current collector while surrounding side surfaces of the cathode active material layer, an anode layer disposed on the solid electrolyte layer and configured to have an area greater than an area of the cathode active material layer but less than an area of the solid electrolyte layer, and a spacer disposed on the solid electrolyte layer and configured to come into contact with side surfaces of the anode layer.

In a preferred embodiment, the area of the solid electrolyte layer may be 1.5 to 2 times the area of the cathode active material layer.

In another preferred embodiment, a thickness of the central part of the solid electrolyte layer may be 30 μm to 40 μm.

In still another preferred embodiment, the anode layer may include an anode current collector and a coating layer disposed on the anode current collector, and the coating layer may be stacked on the solid electrolyte layer so as to come into contact with the solid electrolyte layer.

In yet another preferred embodiment, the coating layer may include a carbon material, and a metal material configured to be combined with lithium to produce an alloy or a compound.

In still yet another preferred embodiment, the anode layer may exclusively include an anode current collector.

In a further preferred embodiment, the anode layer may include an anode active material layer and an anode current collector disposed on the anode active material layer, and the anode active material layer may be stacked on the solid electrolyte layer so as to come into contact with the solid electrolyte layer.

In another further preferred embodiment, a thickness of the spacer based on the stack direction of the all solid state battery may be equal to or greater than a thickness of the anode layer.

In still another further preferred embodiment, the spacer may include at least one material selected from the group consisting of polyethylene (PE), polyethylene naphthalate (PEN), polyethylene terephthalate (PET) and combinations thereof.

In yet another further preferred embodiment, a perpendicular distance A between one side surface of the cathode active material layer and a corresponding side surface of the solid electrolyte layer, a perpendicular distance C between one side surface of the central part of the solid electrolyte layer and a corresponding side surface of the anode layer, and a perpendicular distance B between one side surface of the anode layer and a corresponding side surface of the spacer based on a cross-section of the all solid state battery may satisfy Equation 1:

$$A \leq B+C. \quad \text{Equation 1}$$

In still yet another further preferred embodiment, the perpendicular distance A, the perpendicular distance B and the perpendicular distance C may satisfy an equation $A=B+C$.

In a still further preferred embodiment, the cathode current collector, the cathode active material layer, the solid electrolyte layer and the anode layer may form each unit cell, and two or more unit cells may be stacked.

Another embodiment of the present invention provides a method for manufacturing the all solid state battery, the method including forming the cathode active material layer having the designated area on the cathode current collector, forming the solid electrolyte layer on the cathode active material layer so as to surround the cathode active material layer, forming the anode layer, configured to have the area greater than the area of the cathode active material layer but less than the area of the solid electrolyte layer, on the solid electrolyte layer, forming the spacer, configured to come into contact with the side surfaces of the anode layer, on the solid electrolyte layer, and bonding the cathode current collector, the cathode active material layer, the solid electrolyte layer, the anode layer and the spacer by applying a pressure thereto in a stack direction thereof.

In a preferred embodiment, in the bonding of the cathode current, the cathode active material layer, the solid electrolyte layer, the anode layer and the spacer, a pressure of 400 MPa to 800 MPa may be applied thereto.

Other aspects and preferred embodiments of the invention are discussed infra.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawings.

DETAILED DESCRIPTION OF ILLUSTRATIVE EMBODIMENTS

The above-described objects, other objects, advantages and features of embodiments of the present invention and methods for achieving the same will become apparent from the descriptions of exemplary embodiments given herein below with reference to the accompanying drawings. However, the present invention is not limited to the embodiments disclosed herein and may be implemented in various different forms. The embodiments are provided to make the description of the present invention thorough and to fully convey the scope of the present invention to those skilled in the art.

In the following description of the embodiments, the same elements are denoted by the same reference numerals even when they are depicted in different drawings. In the drawings, the dimensions of structures may be exaggerated compared to the actual dimensions thereof, for clarity of description. In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the invention. Singular expressions may encompass plural expressions, unless they have clearly different contextual meanings.

In the following description of the embodiments, terms, such as "including" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or the possibility of adding the same. In addition, it will be understood that, when a part, such as a layer, a film, a region or a plate, is said to be "on" another part, the part may be disposed "directly on" the other part or other parts may be interposed between the two parts. In the same manner, it will be understood that, when a part, such as a layer, a film, a region or a plate, is said to be "under" another part, the part may be disposed "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

Figure 2:
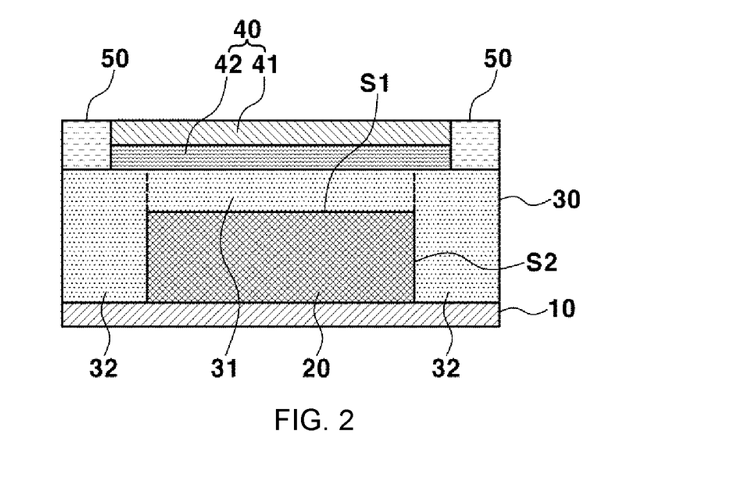
FIG. 2 is a cross-sectional view illustrating an all solid state battery according to one embodiment of the present invention.

FIG. 2 is a cross-sectional view illustrating an all solid state battery according to one embodiment of the present invention. The all solid state battery includes a cathode current collector 10, a cathode active material layer 20 configured such that one surface thereof comes into contact with a designated area of the cathode current collector 10, a solid electrolyte layer 30 disposed on the cathode active material layer 20 so as to surround the other surface S1 and side surfaces S2 of the cathode active material layer 20, an anode layer 40 disposed on the solid electrolyte layer 30 and configured to have an area greater than that of the cathode active material layer 20 but less than that of the solid electrolyte layer 30, and a spacer 50 disposed on the solid electrolyte layer 30 and configured to come into contact with the side surfaces of the anode layer 40.

The cathode current collector 10 may be a plate-shaped base material having electrical conductivity. Here, the cathode current collector 10 may include aluminum foil.

The cathode active material layer 20 may be formed to have an area less than that of the cathode current collector 10, and be disposed on the cathode current collector 10.

The cathode active material layer 20 may include a cathode active material, a solid electrolyte, a conductive material, a binder, etc.

The cathode active material may be an oxide active material or a sulfide active material.

The oxide active material may be a rock salt layer-type active material, such as $LiCoO_2$, $LiM_nO_2$, $LiNiO_2$, $LiVO_2$ or $Li_{1+x}Ni_{1/3}Co_{1/3}Mn_{1/3}O_2$, a spinel-type active material, such as $LiMn_2O_4$ or $Li(Ni_{0.5}Mn_{1.5})O_4$, an inverted spinel-type active material, such as $LiNiVO_4$ or $LiCoVO_4$, an olivine-type active material, such as $LiFePO_4$, $LiMnPO_4$, $LiCoPO_4$ or $LiNiPO_4$, a silicon-containing active material, such as $Li_2FeSiO_4$ or $Li_2MnSiO_4$, a rock salt layer-type active material in which a part of a transition metal is substituted with a different kind of metal, such as $LiNi_{0.8}Co_{(0.2-x)}Al_xO_2$ ($0<x<0.2$), a spinel-type active material in which a part of a transition metal is substituted with a different kind of metal, such as $Li_{1+x}Mn_{2-x-y}M_yO_4$ (M being at least one of Al, Mg, Co, Fe, Ni or Zn, $0<x+y<2$), or lithium titanate, such as $Li_4Ti_5O_{12}$.

The sulfide active material may be copper Chevrel, iron sulfide, cobalt sulfide, nickel sulfide or the like.

The solid electrolyte may be an oxide-based solid electrolyte or a sulfide-based solid electrolyte. Particularly, a sulfide-based solid electrolyte having high lithium ion conductivity may be used. The sulfide-based solid electrolyte may be $Li_2S$—$P_2S_5$, $Li_2S$—$P_2S_5$-LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$-LiI, $Li_2S$—$SiS_2$, $Li_2S$—$SiS_2$-LiI, $Li_2S$—$SiS_2$—LiBr, $Li_2S$—$SiS_2$—LiCl, $Li_2S$—$SiS_2$—$B_2S_3$-LiI, $Li_2S$—$SiS_2$—$P_2S_5$-LiI, $Li_2S$—$B_2S_3$, $Li_2S$—$P_2S_5$—$Z_mS_n$ (m and n being positive numbers, and Z being one of Ge, Zn and Ga), $Li_2S$—$GeS_2$, $Li_2S$—$SiS_2$—$Li_3PO_4$, $Li_2S$—$SiS_2$-$Li_xMO_y$ (x and y being positive numbers, and M being one of P, Si, Ge, B, Al, Ga and In), $Li_{10}GeP_2S_{12}$ or the like, without being limited thereto.

The conductive material may be carbon black, conductive graphite, ethylene black, graphene or the like.

The binder may be butadiene rubber (BR), nitrile butadiene rubber (NBR), hydrogenated nitrile butadiene rubber (HNBR), polyvinylidene difluoride (PVDF), polytetra-fluoroethylene (PTFE), carboxymethyl cellulose (CMC) or the like.

Figure 3:
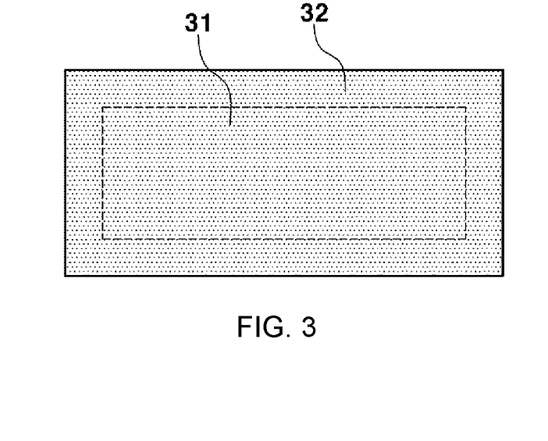
FIG. 3 is a plan view illustrating a solid electrolyte layer of the all solid state battery of FIG. 2.

FIG. 3 is a plan view illustrating the solid electrolyte layer 30 of the all solid state battery of FIG. 2. Referring to FIGS. 2 and 3, the solid electrolyte layer 30 may include a central part 31 disposed on the cathode active material layer 20 based on the stack direction of the all solid state battery, and a peripheral part 32 configured to extend from the central part 31 so as to come into contact with the cathode current collector 10 while surrounding the side surfaces S2 of the cathode active material layer.

Because the solid electrolyte layer 30 surrounds the cathode active material layer 20, when a high pressure is applied to the all solid state battery, the solid electrolyte layer 30 serves as a kind of buffer layer and thus minimizes pressing of the edge of the cathode active material layer 20. Consequently, structural stability of the all solid state battery is improved due to the solid electrolyte layer 30.

The area of the solid electrolyte layer 30 may be 1.5 to 2 times the area of the cathode active material layer 20. The area of the solid electrolyte layer 30 means the area of the solid electrolyte layer 30 when the solid electrolyte layer 30 is looked down on from above, as shown in FIG. 3. When the area of the solid electrolyte layer 30 is excessively large, the area of the peripheral part 32, which performs no role in movement of lithium ions, is increased and may thus cause an increase in production costs, and pressure through the peripheral part 32 is not properly transmitted to the cathode active material layer 20 and may thus cause difficulty in properly forming the interface between the solid electrolyte layer 30 and the side surfaces S2 of the cathode active material layer 20.

The conventional anodeless all solid state battery shown in FIG. 1A includes no anode active material layer, and is thus manufactured in a manner in which the solid electrolyte layer 93 is formed on a free-standing film or release paper and is then adhered or transferred to the anode current collector 94. The reason for this is that the anode current collector 94 is a metal thin film and thus it is difficult to apply the solid electrolyte layer 93 directly thereto, and the anode active material layer 92 has an area less than that of the solid electrolyte layer 93 and thus it is difficult to apply the solid electrolyte layer 93 directly thereto. If the solid electrolyte layer 93 is formed on a free-standing film, it requires a support provided therein and, if the solid electrolyte layer 93 is formed on release paper, it requires a designated thickness so as to be separated from the release paper without damaging the same and thus the conventional solid electrolyte layer 93 requires a thickness of about 100 μm or more.

The all solid state battery according to embodiments of the present invention has a novel structure in which the solid electrolyte layer 30 surrounds the cathode active material layer 20, as shown in FIG. 2, and thus, the solid electrolyte layer 30 may be applied to the cathode active material layer 20 by a method, such as doctor blade coating. That is, it is not necessary to form the solid electrolyte layer 30 on a free-standing film or release paper, and thus, the solid electrolyte layer 30 does not require a large thickness.

Concretely, the thickness of the central part 31 of the solid electrolyte layer 30 may be 30 μm to 40 μm. Because the thickness of the solid electrolyte layer 30 may be remarkably reduced as compared to the thickness of the conventional solid electrolyte layer 93, the energy density of the all solid state battery according to embodiments of the present invention may be greatly increased.

The solid electrolyte layer 30 may include an oxide-based solid electrolyte or a sulfide-based solid electrolyte. Particularly, a sulfide-based solid electrolyte having high lithium ion conductivity may be used. The sulfide-based solid electrolyte may be $Li_2S$—$P_2S_5$, $Li_2S$—$P_2S_5$-LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$-LiI, $Li_2S$—$SiS_2$, $Li_2S$—$SiS_2$-LiI, $Li_2S$—$SiS_2$—LiBr, $Li_2S$—$SiS_2$—LiCl, $Li_2S$—$SiS_2$—$B_2S_3$-LiI, $Li_2S$—$SiS_2$—$P_2S_5$-LiI, $Li_2S$—$B_2S_3$, $Li_2S$—$P_2S_5$—$Z_mS_n$ (m and n being positive numbers, and Z being one of Ge, Zn and Ga), $Li_2S$—$GeS_2$, $Li_2S$—$SiS_2$—$Li_3PO_4$, $Li_2S$—$SiS_2$-$Li_xMO_y$ (here, x and y being positive numbers, and M being one of P, Si, Ge, B, Al, Ga and In), $Li_{10}GeP_2S_{12}$ or the like, without being limited thereto.

According to one embodiment of the present invention, the anode layer 40 may include, as shown in FIG. 2, an anode current collector 41 and a coating layer 42 disposed on the anode current collector 41, and the coating layer 42 may be stacked on the solid electrolyte layer 30 so as to come into contact with the solid electrolyte layer 30.

The anode current collector 41 may be a plate-shaped base material having electrical conductivity. Here, the anode current collector 41 may include at least one selected from the group consisting of nickel (Ni), stainless steel (SUS) and a combination thereof.

The anode current collector 41 may be a high-density metal thin film having porosity of less than about 1%.

The anode current collector 41 may have a thickness of 1 μm to 20 μm, or 5 μm to 15 μm.

The coating layer 42 induces lithium ions moved from the cathode active material layer 20 to be uniformly precipitated as a filler product on the anode current collector 41 when the all solid state battery is charged.

The coating layer 42 may include a carbon material, and a metal material which may be combined with lithium to produce an alloy or a compound.

The carbon material may include at least one selected from the group consisting of a particulate carbon material, a fibrous carbon material and a combination thereof.

The particulate carbon material may include at least one selected from the group consisting of carbon black, graphitizable carbon, non-graphitizable carbon and combinations thereof. The particulate carbon material may have a particle diameter of 10 nm to 200 nm.

Further, the fibrous carbon material may include at least one selected from the group consisting of carbon nanofibers, carbon nanotubes, vapor grown carbon fibers and combinations thereof. The fibrous carbon material may have a cross-sectional diameter of 10 nm to 200 nm.

The metal material may include, for example, at least one selected from the group consisting of zinc, germanium, tin, antimony, platinum, gold, bismuth, magnesium, aluminum, silver and combinations thereof, without being limited thereto.

Figure 4:
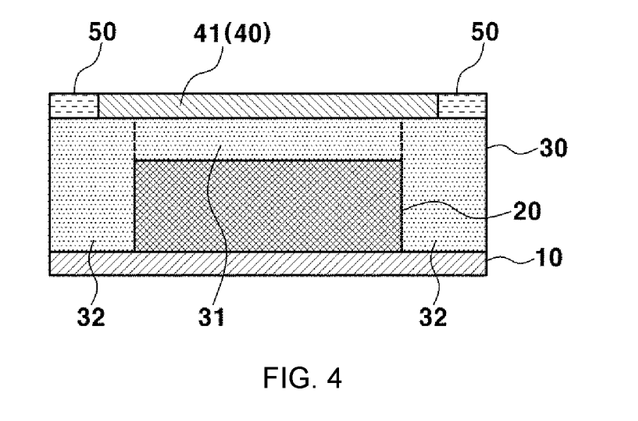
FIG. 4 is a cross-sectional view illustrating an all solid state battery according to another embodiment of the present invention.

According to another embodiment of the present invention, the anode layer 40 may include an anode current collector 41 alone, as shown in FIG. 4. The anode current collector 41 has been already described above and a detailed description thereof will thus be omitted.

Figure 5:
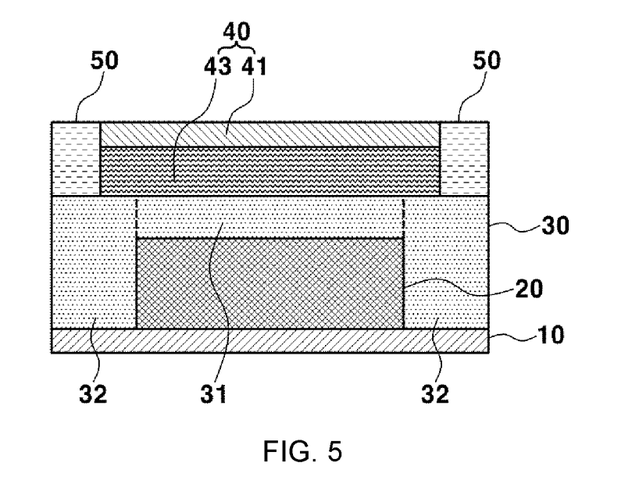
FIG. 5 is a cross-sectional view illustrating an all solid state battery according to yet another embodiment of the present invention.

According to yet another embodiment of the present invention, the anode layer 40 may include an anode active material layer 43 and an anode current collector 41 disposed on the anode active material layer 43, as shown in FIG. 5, and the anode active material layer 43 may be stacked on the solid electrolyte layer 30 so as to come into contact with the solid electrolyte layer 30. The novel structure of the all solid state battery according to embodiments of the present invention may be applied not only to an anode all solid state battery but also to a general all solid state battery including an anode active material.

The anode active material layer 43 may include an anode active material, a solid electrolyte, a binder, etc.

The anode active material may be, for example, a carbon active material or a metal active material, without being limited hereto.

The carbon active material may be mesocarbon microbeads (MCMB), graphite, such as highly oriented pyrolytic graphite (HOPG), or amorphous carbon, such as hard carbon or soft carbon.

The metal active material may be In, Al, Si, An, or an alloy including at least one thereof.

The solid electrolyte may include an oxide-based solid electrolyte or a sulfide-based solid electrolyte. Particularly, a sulfide-based solid electrolyte having high lithium ion conductivity may be used. The sulfide-based solid electrolyte may be $Li_2S$—$P_2S_5$, $Li_2S$—$P_2S_5$-LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$-LiI, $Li_2S$—$SiS_2$, $Li_2S$—$SiS_2$-LiI, $Li_2S$—$SiS_2$—LiBr, $Li_2S$—$SiS_2$—LiCl, $Li_2S$—$SiS_2$—$B_2S_3$-LiI, $Li_2S$—$SiS_2$—$P_2S_5$-LiI, $Li_2S$—$B_2S_3$, $Li_2S$—$P_2S_5$—$Z_mS_n$ (m and n being positive numbers, and Z being one of Ge, Zn and Ga), $Li_2S$—$GeS_2$, $Li_2S$—$SiS_2$—$Li_3PO_4$, $Li_2S$—$SiS_2$-$Li_xMO_y$ (x and y being positive numbers, and M being one of P, Si, Ge, B, Al, Ga and In), $Li_{10}GeP_2S_{12}$ or the like, without being limited thereto.

The binder may be butadiene rubber (BR), nitrile butadiene rubber (NBR), hydrogenated nitrile butadiene rubber (HNBR), polyvinylidene difluoride (PVDF), polytetra-fluoroethylene (PTFE), carboxymethyl cellulose (CMC) or the like.

The spacer 50 is provided in a space between the solid electrolyte layer 30 and the side surfaces of the anode layer 40 and serves to secure the structural stability of the all solid state battery.

The side surfaces of the spacer 50 may be disposed coplanar with the side surfaces of the solid electrolyte layer 30, and the thickness of the spacer 50 based on the stack direction of the all solid state battery may be equal to or greater than the thickness of the anode layer 40.

When a high pressure is applied to the all solid state battery, the cathode current collector 10 and the anode current collector 41, which are metal thin films, may be elongated, and thus the ends of the elongated cathode current collector 10 and anode current collector 41 come into contact with each other, thereby causing a short in the all solid state battery. The spacer 50 serves to prevent this, and is disposed at the side surfaces of the anode current collector 41 so as to prevent elongation of the anode current collector 41 under high pressure.

The spacer 50 may include at least one selected from the group consisting of polyethylene (PE), polyethylene naphthalate (PEN), polyethylene terephthalate (PET) and combinations thereof.

Figure 6:
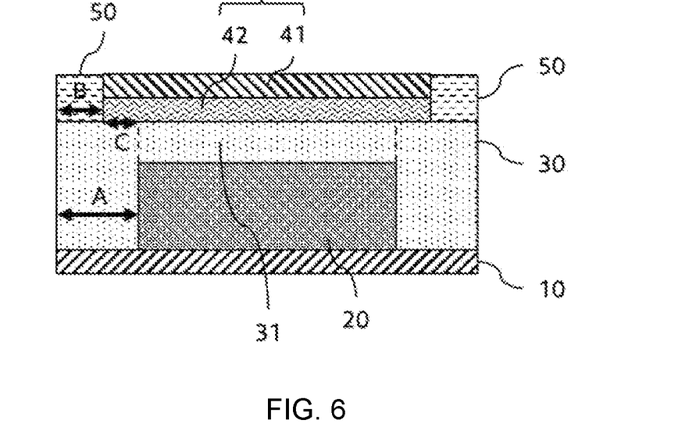
FIG. 6 is a reference view illustrating Equation 1 in an all solid state battery according to one embodiment of the present invention.

In the all solid state battery according to embodiments of the present invention, as shown in FIG. 6, a perpendicular distance A between one side surface of the cathode active material layer 20 and a corresponding side surface of the solid electrolyte layer 30, a perpendicular distance C between one side surface of the central part 31 of the solid electrolyte layer 30 and a corresponding side surface of the anode layer 40, and a perpendicular distance B between one side surface of the anode layer 40 and a corresponding side surface of the spacer 50 based on the cross-section of the all solid state battery may satisfy Equation 1 below.

$$A \leq B+C \qquad \text{Equation 1}$$

Here, "the perpendicular distance" means, if one point on one side surface of one element and one point on one side surface of another element are connected, a distance between the two points when the connection line of the two points meets the side surfaces of the respective elements at right angles based on the cross-section of the all solid state battery.

Further, "the cross-section of the all solid state battery" means the cross-section of the all solid state battery in a direction parallel to the stack direction of the all solid state battery.

Particularly, the perpendicular distance A, the perpendicular distance B and the perpendicular distance C in the all solid state battery may satisfy an equation $A=B+C$.

In the all solid state battery according to embodiments of the present invention, the cathode current collector 10, the cathode active material layer 20, the solid electrolyte layer 30, the anode layer 40 and the spacer 50 may form each unit cell, and two or more unit cells may be stacked.

A method for stacking the unit cells is not limited to a specific method, and the unit cells may be stacked in a monopolar structure or a bipolar structure. The height of the spacer 50, etc. acquired thereby may be properly adjusted.

A method for manufacturing an all solid state battery according to embodiments of the present invention may include forming a cathode active material layer having a designated area on a cathode current collector, forming a solid electrolyte layer on the cathode active material layer so as to surround the cathode active material layer, forming a spacer on the solid electrolyte layer, forming an anode layer in a space formed by the solid electrolyte layer and the spacer, and bonding the cathode current collector, the cathode active material layer, the solid electrolyte layer, the spacer and the anode layer by applying a pressure of 400 MPa to 800 MPa thereto in a stack direction thereof.

Hereinafter, embodiments of the present invention will be described in more detail through the following example. The following example serves merely to exemplarily describe an embodiments of the present invention and is not intended to limit the scope of the invention.

Comparative Example

The conventional all solid state battery shown in FIG. 1A according to a comparative example was manufactured, and then the respective elements thereof were bonded by applying a pressure of about 450 MPa thereto in the stack direction thereof.

Figure 7A:
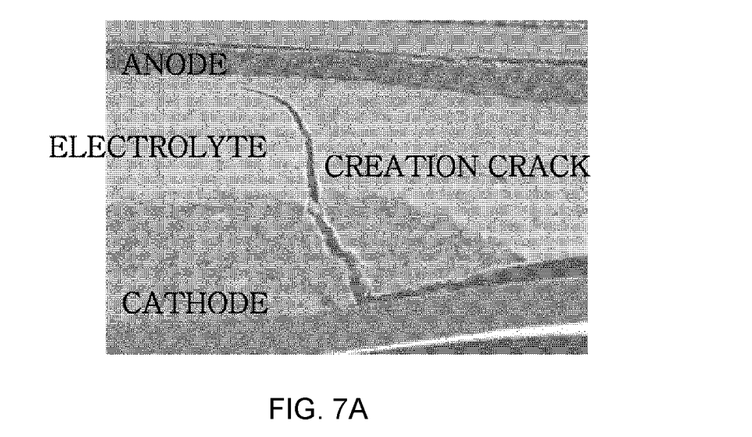
FIG. 7A is a scanning electron microscope (SEM) photograph showing a result of analysis of the cross-section of an all solid state battery according to a comparative example.

FIG. 7A is a scanning electron microscope (SEM) photograph showing a result of analysis of the cross-section of the all solid state battery according to the comparative example. Referring to this figure, it may be confirmed that a large crack was created in the cathode and the electrolyte.

Figure 7B:
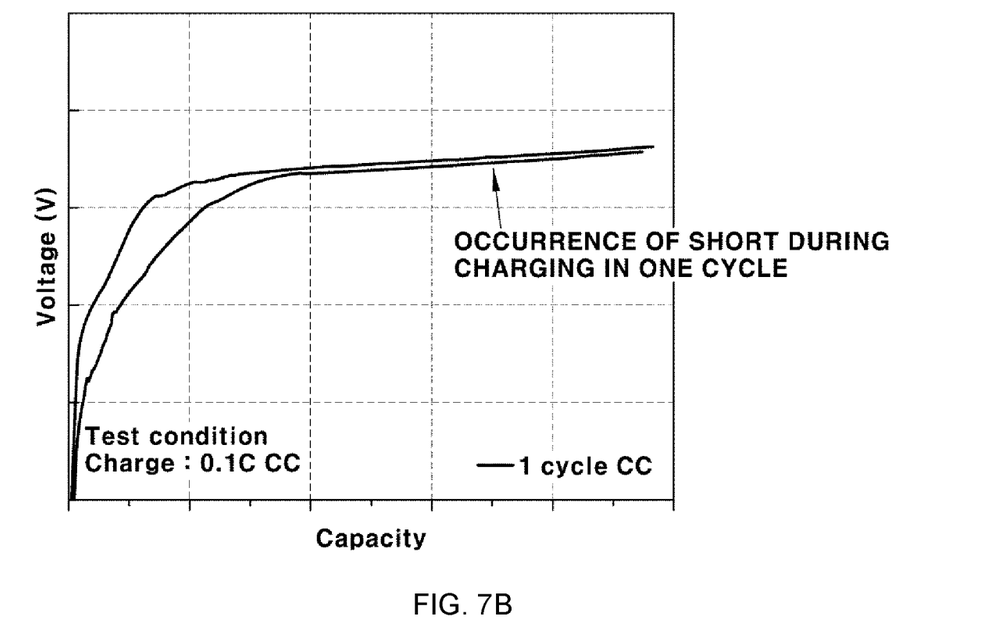
FIG. 7B is a graph showing a result of charging and discharging of the all solid state battery according to the comparative example.

FIG. 7B is a graph showing a result of charging and discharging of the all solid state battery according to the comparative example. Referring to this figure, it may be confirmed that a short occurred during charging in one cycle.

Example

The all solid state battery shown in FIG. 2 according to the example of an embodiment of the present invention was manufactured, and the respective elements thereof were bonded by applying a pressure of about 450 MPa thereto in the stack direction thereof.

Figure 8A:
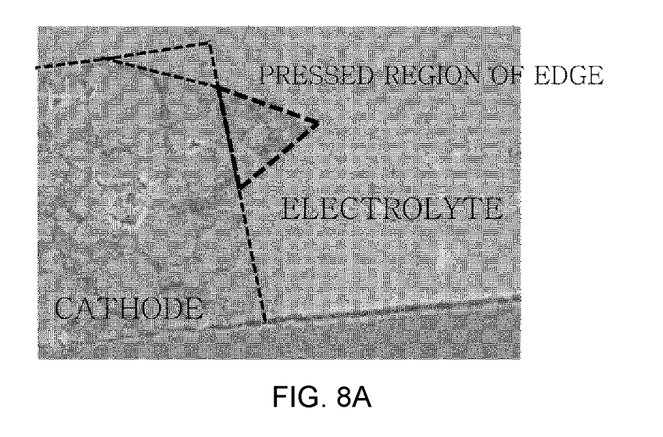
FIG. 8A is a scanning electron microscope (SEM) photograph showing a result of analysis of the cross-section of an all solid state battery according to an example of an embodiment of the present invention.

FIG. 8A is a scanning electron microscope (SEM) photograph showing a result of analysis of the cross-section of the all solid state battery according to the example of the embodiment of the present invention. Referring to this figure, it may be confirmed that no crack was created in the cathode and the electrolyte. Particularly, it may be confirmed that even when a high pressure was applied to the all solid state battery, the edge of the cathode did not collapse and an interface was properly formed between the cathode and the electrolyte.

Figure 8B:
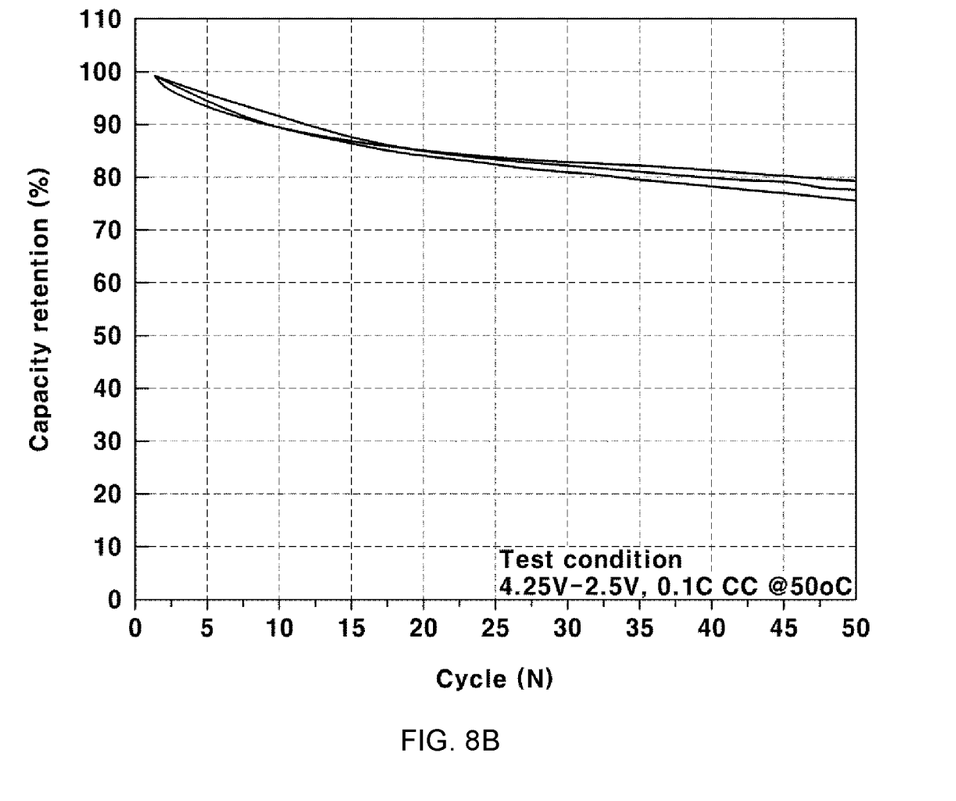
FIG. 8B is a graph showing a result of measurement of the capacity retention ratio of the all solid state battery according to the example of the embodiment of the present invention.

FIG. 8B is a graph showing a result of measurement of the capacity retention ratio of the all solid state battery according to the example of the embodiment of the present invention. Referring to this figure, the all solid state battery according to the example of the embodiment of the present invention, even when charging and discharging of the all solid state battery according to the example of the embodiment of the present invention was 50 times or more, the all solid state battery exhibited a capacity retention ratio of 75% or more, i.e., was still very stable.

As is apparent from the above description, embodiments of the present invention provide an anodeless all solid state battery having a novel structure with high durability and high energy density.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An all solid state battery comprising:
   a cathode current collector;
   a cathode active material layer disposed on the cathode current collector and in contact with a designated area of the cathode current collector;
   a solid electrolyte layer disposed on the cathode active material layer, and comprising a central part disposed on the cathode active material layer based on a stack direction of the all solid state battery, and a peripheral part extending from the central part and contacting the cathode current collector while surrounding side surfaces of the cathode active material layer, and comprising a solid electrolyte;

an anode layer disposed on the solid electrolyte layer and having an area greater than an area of the cathode active material layer but less than an area of the solid electrolyte layer; and
a spacer disposed on the solid electrolyte layer, wherein:
an inner side surface of the spacer surrounds the anode layer by contacting an entirety of all side surfaces of the anode layer,
the anode layer comprises an anode current collector, and a coating layer disposed on the anode current collector, and
the coating layer is stacked on the solid electrolyte layer in contact with the solid electrolyte layer.

2. The all solid state battery of claim 1, wherein the area of the solid electrolyte layer is 1.5 to 2 times the area of the cathode active material layer.

3. The all solid state battery of claim 1, wherein the coating layer comprises a carbon material and a metal material configured to be combined with lithium to produce an alloy or a compound.

4. The all solid state battery of claim 1, wherein a thickness of the spacer based on the stack direction of the all solid state battery is equal to or greater than a thickness of the anode layer.

5. The all solid state battery of claim 1, wherein the spacer comprises polyethylene (PE), polyethylene naphthalate (PEN), polyethylene terephthalate (PET), or a combination thereof.

6. The all solid state battery of claim 1, wherein a perpendicular distance A between one side surface of the cathode active material layer and a corresponding side surface of the solid electrolyte layer, a perpendicular distance C between one side surface of the central part of the solid electrolyte layer and a corresponding side surface of the anode layer, and a perpendicular distance B between one side surface of the anode layer and a corresponding side surface of the spacer based on a cross-section of the all solid state battery satisfy $A \leq B+C$.

7. The all solid state battery of claim 6, wherein the perpendicular distance A, the perpendicular distance B and the perpendicular distance C satisfy $A=B+C$.

8. The all solid state battery of claim 1, wherein a unit cell is formed by the cathode current collector, the cathode active material layer, the solid electrolyte layer and the anode layer, and two or more unit cells are stacked.

9. The all solid state battery of claim 1, wherein a thickness of the central part of the solid electrolyte layer is 30 µm to 40 µm.

10. A method for manufacturing the all solid state battery of claim 1, the method comprising:
forming the cathode active material layer having the designated area on the cathode current collector;
forming the solid electrolyte layer on the cathode active material layer, and comprising the central part disposed on the cathode active material layer based on the stack direction of the all solid state battery, and the peripheral part extending from the central part and contacting the cathode current collector while surrounding the side surfaces of the cathode active material layer, and comprising the solid electrolyte;
forming the anode layer on the solid electrolyte layer, the anode layer having the area greater than the area of the cathode active material layer but less than the area of the solid electrolyte layer, wherein forming the anode layer comprises forming the coating layer in contact with the solid electrolyte layer, and forming the anode current collector on the coating layer;
forming the spacer on the solid electrolyte layer, wherein the inner side surface of the spacer surrounds the anode layer by contacting the entirety of all of the side surfaces of the anode layer; and
bonding the cathode current collector, the cathode active material layer, the solid electrolyte layer, the anode layer and the spacer by applying a pressure thereto in the stack direction thereof.

11. The method of claim 10, wherein the pressure comprises 400 MPa to 800 MPa.

12. The method of claim 10, wherein a thickness of the spacer based on the stack direction of the all solid state battery is equal to or greater than a thickness of the anode layer.

13. The method of claim 10, wherein the spacer comprises polyethylene (PE), polyethylene naphthalate (PEN), polyethylene terephthalate (PET), or a combination thereof.

14. The method of claim 10, wherein a perpendicular distance A between one side surface of the cathode active material layer and a corresponding side surface of the solid electrolyte layer, a perpendicular distance C between one side surface of the central part of the solid electrolyte layer and a corresponding side surface of the anode layer, and a perpendicular distance B between one side surface of the anode layer and a corresponding side surface of the spacer based on a cross-section of the all solid state battery satisfy $A \leq B+C$.

15. The method of claim 10, wherein a perpendicular distance A between one side surface of the cathode active material layer and a corresponding side surface of the solid electrolyte layer, a perpendicular distance C between one side surface of the central part of the solid electrolyte layer and a corresponding side surface of the anode layer, and a perpendicular distance B between one side surface of the anode layer and a corresponding side surface of the spacer based on a cross-section of the all solid state battery satisfy $A=B+C$.

16. The method of claim 10, wherein the area of the solid electrolyte layer is 1.5 to 2 times the area of the cathode active material layer.

17. The method of claim 10, wherein a thickness of the central part of the solid electrolyte layer is 30 µm to 40 µm.

18. The method of claim 10, wherein the coating layer comprises a carbon material and a metal material configured to be combined with lithium to produce an alloy or a compound.

19. The method of claim 10, wherein a unit cell is formed by the cathode current collector, the cathode active material layer, the solid electrolyte layer and the anode layer, and two or more unit cells are stacked.

* * * * *